3,074,832
PLASTIC WINDOW PLATE STRUCTURE AND
METHOD OF MAKING SAME
Roderich Gräff, Weiden, Upper Franconia, Germany, assignor to Deutsche Tafelglas Aktiengesellschaft Detag, Fürth, Bavaria, Germany, a corporation of Germany
Filed Dec. 4, 1957, Ser. No. 700,724
12 Claims. (Cl. 154—43)

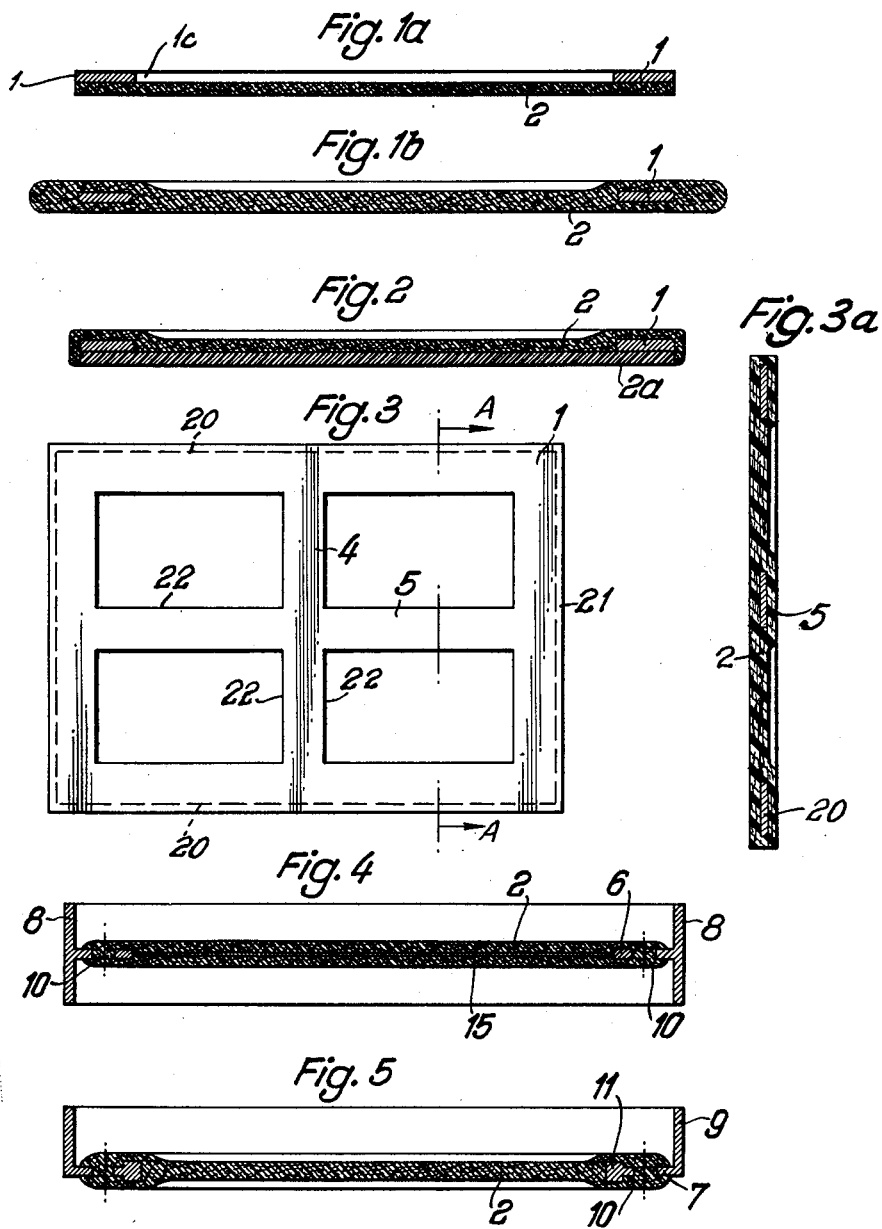
Jan. 22, 1963   R. GRÄFF   3,074,832
PLASTIC WINDOW PLATE STRUCTURE AND METHOD OF MAKING SAME
Filed Dec. 4, 1957   2 Sheets-Sheet 1
Inventor:
Rodrich Gräff Jan. 22, 1963 R. GRÄFF 3,074,832
PLASTIC WINDOW PLATE STRUCTURE AND METHOD OF MAKING SAME
Filed Dec. 4, 1957 2 Sheets-Sheet 2
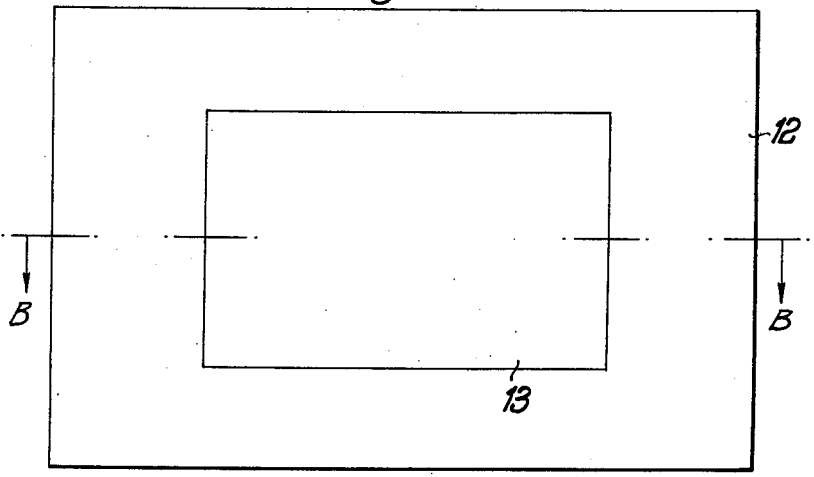
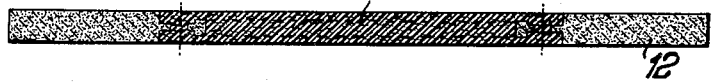
Inventor:
Roland Gräff United States Patent Office 3,074,832
Patented Jan. 22, 1963

The invention relates to plates of synthetic plastic.

Plates of synthetic plastic were introduced a few years ago, owing to their low weight and their resistance to breakage and weather, for building purposes and in many other fields of employment. They may, as desired, be made of transparent materials having a very great permeability to light, or of translucent materials having desired degrees of dispersion or they may be made of opaque materials. A further advantage is the ease with which they can be coloured. Such plates are generally reinforced with glass fibres, for example with glass-fibre mats or fabrics, although other fibrous reinforcing materials, such as asbestos, mineral wool, textiles or synthetic plastic threads may be used. Such plates are made of resins of various compositions, for example, polyesters, unsaturated self-extinguishing polyesters, epoxy resins, phenol resins, melamine resins or silicone resins.

For some applications, it is disadvantageous for these plates to have a very low modulus of elasticity, and consequently, a very low rigidity. Thus when rigidity has been a necessary characteristic for the plates the latter have as a rule, been made in a corrugated form. In many fields, for example for glazing ordinary window frames, for self-supporting partitions, in the construction of tanks or sky-lights, in which corrugated plates can be used only in conjunction with special expedients for sealing their edges, such plates have not been introduced.

An object of the present invention is to provide a process for the production of plates which do not suffer from these disadvantages, the process enabling flat plates of considerable rigidity to be produced.

Thus from one aspect the present invention provides a process for the production of synthetic plastic plates, such process comprising applying a sheet of plastic material in a state of incomplete curing which shrinks on curing, to a rigid frame, and curing such sheet to bond same to said frame and to tauten on the frame by shrinkage.

Said frame may be of any suitable material, for instance metal, and may entirely circumscribe an area of the sheet or be discontinuous around such area. The frame may be bonded to the margins of the sheet or it may be bonded to the sheet within the margins of the latter. The sheet may be reinforced by the inclusion of fibrous reinforcing material as in known plates, a particularly suitable reinforcing material being matted or woven glass fibres. The plastic of the sheet may desirably be polyester resin.

The invention further provides a synthetic plastic plate as produced by the method outlined above, such plate comprising a rigid frame bonded to a sheet of plastic material that shrinks on curing and which has tautened on such frame by curing shrinkage.

Such a plate constitutes a structural element in which the combination of a rigid frame and a taut sheet of plastic bonded thereto provides great rigidity with light weight and, especially, with economy in the amount of plastic embodied in the plate. Thus the aforesaid combination develops the strength inherent in the plastic to its best advantage. It may here be noted that the sheet may have a thickness of the order of 1–2 mm.

In a preferred embodiment of the invention, a rigid frame, e.g. of metal, is covered on one or both sides with matted or woven glass fibre, which is thereupon impregnated with synthetic plastic, for example a polyester resin, which shrinks upon complete curing, or polymerisation, or in a state of incomplete curing, whereafter the resin is completely cured or polymerised by the action of catalysts, accelerators and/or heat.

In another embodiment of the invention, a rigid frame, e.g. of metal, is connected on one side e.g. by adhesive, to a cured sheet of synthetic plastic, for example of polyester resin, and then partially or completely covered on its other side with glass fibre, for example matted or woven glass fibre, which is then impregnated with a resin that shrinks on complete curing or polymerisation, such resin being applied in a state of incomplete curing and thereafter being completely cured or polymerised by the action of catalysts, accelerators and/or heat.

The invention will be further explained with the aid of the accompanying drawings which illustrate, by way of non-limitative example, certain embodiments and in which:

FIGURE 1a is a cross-sectional view taken through a rectangular frame structure similar to FIGURE 3 showing one form of a plate structure in accordance with the invention;

FIGURE 1b is a cross-sectional view of a frame structure similar to FIGURE 3 and illustrating another form of the invention with the frame covered and the covering extending beyond the edges thereof;

FIGURE 2 illustrates, in cross-section, a further form of plate;

FIGURE 3 illustrates another form of plate, in plan view;

FIGURE 3a is a section on line A—A of FIGURE 3;

FIGURE 4 illustrates another form of plate, in cross-section;

FIGURE 5 illustrates a modification of the plate of FIGURE 4;

FIGURE 6 illustrates yet another form of plate, in plan view; and

FIGURES 7 to 10 are cross-sections, on line B—B of FIGURE 6, illustrating different modes of connecting the sheet to the frame in said plate.

In the embodiment illustrated in FIGURE 1a, a stiff flat frame structure 1 of rigid material for example metal, and including top and bottom rails connected by side rails similar to the top, bottom and side rails 20 and 21 shown in FIG. 3 is provided. Connected to the frame 1 under tension, on only one side, is a sheet 2 of polyester resin of, for example, 1–2 mm. thickness, such sheet preferably having been reinforced with glass fibres. The flat frame structure 1 is provided with a central opening 1c. In the embodiment of FIGURE 1b, the frame 1 is completely enveloped by the sheet 2, the frame thus being protected from corrosion. By extending the sheet beyond the edge of the frame 1, as shown in FIGURE 1b, the edge 3 of the sheet can be shaped as shown and employed as a fitting edge to facilitate the mounting of the plate in, for example, a window frame.

FIGURE 2 illustrates a form of plate which has been produced by the following procedure: one side of a flat frame 1 is first of all connected, for example by adhesive, with a finished sheet 2a of any desired material, for example a sheet of cured polyester resin. Thereupon, the other side of the frame is covered with a glass fibre fleece, the latter is impregnated with the resin in a state of incomplete curing and the resin is then completely cured. A rigid bond is thus produced between the plate 2a, the frame 1 and the resin of the fleece which tautens during the curing.

As illustrated in FIGURE 3, the frame 1 is provided with top and bottom rails 20 connected by side rails 21 and may be divided internally by cross braces 4 and 5, so that the area within the frame is sub-divided into several window lights 22 which may be individually filled with plastic sheets or as illustrated in FIGURE 3a, are filled by a sheet which extends over the whole frame.

In the embodiments illustrated in FIGURES 4 and 5, the frames include flat, strip-like parts 6, 7 which extend parallel to the plane of the sheet 2, these parts carrying, at their outer edges, transverse strips 8, 9 so that T- and L-shaped frame profiles are produced. The parts 6, 7 of the frames may be provided with bores 10 (FIGURE 4) through which the mass of synthetic plastic passes to ensure a rigid union of the frame and the sheet. For the same purpose, the inner margin of the flat frame part 7 (FIGURE 5) has a bead-like extension 11.

FIGURE 6 illustrates an embodiment having a wide frame 12 of, for example, asbestos cement but which may also be of any other desired material, which is provided with one or more small window-like openings 13 which may be filled with sheets of synthetic plastic. The separate cross sections shown in FIGURES 7 to 10 illustrate the manner in which a sheet 14 of synthetic plastic can be mounted in an opening such as opening 13 in FIGURE 6.

As illustrated in FIGURE 4, threads, wires or tapes 15 of metal, coloured synthetic plastic or other materials may be arranged within the plastic sheet, in order to increase the resistance to breaking of the finished plate, and/or to obtain a decorative effect. These insertions may be rigidly connected with the frame, and may be introduced into the plastic sheet by, for example, pressing or curing them in place therein. The insertions may be arranged parallel with one another or in the form of a pattern, for example as mesh or braid.

The frame of a plate in accordance with the invention may have any desired shape; for example it may be circular or may enclose only three sides of a rectangular area of the plate. Moreover, the frame may be fitted to another structure, for example the casement of a window, or it may be formed as a cloche, e.g. for early beets. Further, any other desired bodies with flat boundaries, acting as frames, may be covered, in the manner described, with sheets of synthetic plastic; for example, tanks, structural parts, frames for double glazing and the like.

In the production of plates in accordance with the invention, a flat base plate, for example, a metal plate, may be coated with a separating means for the purpose of facilitating the subsequent detachment of the finished plate. A glass-fibre fleece of, e.g. matted or woven glass fibre, and a rigid, e.g. metal, frame are then successively laid on the coated base plate. The surface of the frame can then, if desired, be covered with a further glass-fibre fleece. The glass-fibre fleece is then impregnated with a synthetic plastic, that shrinks on complete curing, in a state of incomplete curing, to which catalysts and accelerators may be added in the known manner. The complete curing of this plastic may then be brought about at room temperature or at an elevated temperature. Instead of coating the base plate with a separating means, the base plate may be covered with a separating foil of, for example, cellophane or cellulose hydrate. Only when the plastic requires curing in the absence of air need the assembly on the base plate be covered, e.g. with a separating foil.

All resins that shrink as they solidify or set may be employed for the production of the plates in accordance with the invention. Preferably, polyester resins are used. In the production of these polyester resins, a polybasic unsaturated carboxylic acid (for example maleic acid, fumaric acid, itaconic acid or their anhydrides) is first of all reacted in known manner with an unsaturated monovalent or saturated divalent alcohol (for example allyl alcohols, glycols or polyglycols) to form an unsaturated alkyd resin. This alkyd resin is then treated with unsaturated polymerisable compounds (for example styrene, cyclopentadiene, cyclohexene or methylmethacrylate) whereupon, after admixing catalysts and accelerators and painting the resin on the glass-fibre fleece, the curing or setting takes place in the known manner in a few hours at room temperature. Instead of the resins hereinbefore mentioned, unsaturated self-extinguishing resins such as epoxy resins, phenol resins or melamine resins, silicone resins or other synthetic plastics which shrink on complete curing may be employed.

I claim:

1. A process for the production of a lightweight and rigid window panel plate comprising at least one opening in a flat frame with at least the marginal frame area surrounding said opening being disposed in a single plane, the steps of applying to said frame to cover said opening at least one relatively thin sheet of glass fibre impregnated with a thermosetting synthetic resin plastic material while said plastic material is in a state of incomplete curing, curing said plastic material with said sheet in situ to bond the sheet to said frame, and permitting said sheet to shrink and be drawn tightly over said opening upon complete polymerization of said resin plastic material.

2. The process of claim 1 in which a sheet of said material is bonded to both sides of said frame.

3. The process of claim 1 in which a cured sheet of said plastic is connected to one side of said frame and in which a further sheet of said plastic material in an incomplete state of curing is applied to the other side of said frame and finally cured and bonded onto said frame and to said cured sheet.

4. A lightweight rigid window panel plate structure, comprising a rigid frame having at least one opening with the marginal frame area surrounding said opening extending in a single flat plane, and at least one thin sheet of shunk glass fibre impregnated with a thermosetting synthetic resin plastic material covering said opening and stretched tightly thereover with its marginal area bonded to said frame by polymerization.

5. A lightweight rigid window panel plate structure, comprising a closed rigid frame bounding an opening with the marginal frame area surrounding said opening extending in a single plane, and a sheet of shrunk glass fibre impregnated with a thermosetting synthetic resin plastic material stretched tightly over said opening to form a covering therefor and having its marginal area bonded to said frame upon polymerization of said plastic material.

6. A lightweight rigid window panel plate structure, comprising a rigid substantially flat frame having at least one opening with the marginal frame area surrounding said opening extending in a single plane, one sheet of plastic material being fastened to each side of said frame so as to cover said opening, with at least one of said sheets being a sheet of shrunk glass fibre impregnated with a thermosetting synthetic resin and stretched tightly over said opening to provide a reinforced plastic sheet, with its marginal area bonded to said frame by polymerization.

7. A lightweight rigid window panel plate structure, comprising a substantially flat frame with a flange at its outer margin and having at least one opening with the marginal frame area surrounding said opening extending in a single plane, and at least one thin sheet of shrunk glass fibre impregnated with a thermosetting synthetic resin stretched tightly over said opening to cover the same and a bond between the marginal area of said sheet and frame formed upon polymerization.

8. The plate structure of claim 7 in which the inner marginal area of said frame is provided with small apertures spaced from the inner margin and disposed within the area covered by the sheet of plastic material bonded to said frame upon polymerization.

9. The plate structure of claim 7 in which the inner marginal area of said frame is provided with a bead-like extension which insures a rigid bond of the plastic sheet with the frame.

10. A lightweight rigid window panel plate structure, comprising a rigid frame having at least one opening with the marginal frame area surrounding said opening extending in a single plane, and at least one thin reinforced sheet of shrunk glass fibre impregnated with a thermosetting synthetic resin stretched tightly over said opening to completely cover the same and having its marginal area bonded to the frame upon polymerization to one side of said frame and offset from the plane of said frame.

11. A lightweight rigid window panel plate structure of transparent and translucent synthetic plastic, comprising a rigid frame having an opening, at least one sheet of thermosetting plastic material reinforced with glass fiber and having its marginal edges bonded to said frame and completely extending across and covering said opening, and cross braces extending across said opening and connected with said frame, said plastic sheet being bonded to said cross braces as well as to said frame.

12. A lightweight panel structure of transparent and translucent synthetic plastic, comprising a rigid rectangular frame having an opening, a synthetic plastic sheet of thermosetting synthetic resin material, said plastic material being reinforced with glass fibers, the edges of said sheet of plastic material being bonded to the marginal edge of said frame to completely cover and extend across said opening, said plastic sheet being stretched tightly over said opening and arranged in a plane substantially coincident with the plane of said frame structure.

References Cited in the file of this patent

UNITED STATES PATENTS

| | | |
|---|---|---|
| 1,269,420 | Gibbons | June 11, 1918 |
| 1,479,936 | Stevens | Jan. 8, 1924 |
| 1,811,067 | Valle | June 23, 1931 |
| 1,830,236 | Metz | Nov. 3, 1931 |
| 2,027,962 | Currie | Jan. 14, 1936 |
| 2,058,703 | Malivert | Oct. 27, 1936 |
| 2,202,397 | Owen | May 28, 1940 |
| 2,313,889 | Porter | Mar. 16, 1943 |
| 2,396,712 | Luttge et al. | Mar. 19, 1946 |
| 2,419,758 | Borkland | Apr. 29, 1947 |
| 2,483,916 | Lysak | Oct. 4, 1949 |
| 2,497,376 | Swallow et al. | Feb. 14, 1950 |
| 2,565,316 | Lucas et al. | Aug. 21, 1951 |
| 2,605,203 | Silver | July 29, 1952 |
| 2,667,098 | McMullen | Jan. 26, 1954 |
| 2,704,108 | Downing | Mar. 15, 1955 |
| 2,744,044 | Toulmin | May 1, 1956 |
| 2,751,629 | Dick | June 26, 1956 |
| 2,756,524 | Kleinsorge | July 31, 1956 |
| 2,782,459 | Moncrieff | Feb. 26, 1957 |
| 2,795,523 | Cobb et al. | June 11, 1957 |
| 2,805,974 | Brucker | Sept. 10, 1957 |
| 2,821,155 | Seckel | Jan. 28, 1958 |
| 2,826,240 | Meier et al. | Mar. 11, 1958 |
| 2,828,799 | Harrison | Apr. 1, 1958 |
| 2,938,238 | Gewecke et al. | May 31, 1960 |

FOREIGN PATENTS

| | | |
|---|---|---|
| 358,715 | Great Britain | Oct. 15, 1931 |